United States Patent [19]

Meier et al.

[11] Patent Number: 5,327,471
[45] Date of Patent: Jul. 5, 1994

[54] NUCLEAR REACTOR FUEL ASSEMBLY WITH A SUPPORTING COOLANT TUBE

[75] Inventors: Werner Meier, Kunreuth; Hans-Joachim Lippert, Höchstadt/Aisch; Hans Lettau, Effeltrich; Kurt Kraus, Höchstadt/Aisch, all of Fed. Rep. of Germany

[73] Assignee: Siemens Aktiengesellschaft, Munich, Fed. Rep. of Germany

[21] Appl. No.: 924,056

[22] Filed: Aug. 28, 1992

Related U.S. Application Data

[63] Continuation of PCT/DE91/00168, Feb. 27, 1991.

[30] Foreign Application Priority Data

Feb. 28, 1990 [DE] Fed. Rep. of Germany ....... 4006262
Sep. 18, 1990 [DE] Fed. Rep. of Germany ....... 4029539

[51] Int. Cl.$^5$ .................................................. G21C 3/34
[52] U.S. Cl. ..................................... 376/439; 376/444
[58] Field of Search ............... 376/435, 440, 444, 446, 376/443, 439

[56] References Cited

U.S. PATENT DOCUMENTS

| | | | |
|---|---|---|---|
| 4,499,047 | 2/1985 | Borrman et al. | 376/434 |
| 4,587,093 | 5/1986 | Borrman et al. | 376/444 |
| 4,675,154 | 6/1987 | Nelson et al. | 376/444 |
| 4,781,885 | 11/1988 | Lill et al. | 376/444 |
| 4,876,063 | 10/1989 | Johansson | 376/444 |
| 5,002,724 | 3/1991 | Elkins et al. | 376/435 |

FOREIGN PATENT DOCUMENTS

| | | |
|---|---|---|
| 0054827 | 6/1982 | European Pat. Off. |
| 0099323 | 1/1984 | European Pat. Off. |
| 0224728 | 6/1987 | European Pat. Off. |
| 0283839 | 9/1988 | European Pat. Off. |
| 0307705 | 3/1989 | European Pat. Off. |
| 3907638 | 11/1989 | Fed. Rep. of Germany. |

*Primary Examiner*—Donald P. Walsh
*Assistant Examiner*—Meena Chelliah
*Attorney, Agent, or Firm*—Herbret L. Lerner; Laurence A. Greenberg

[57] ABSTRACT

In order to obviate the use of supporting rods, an upper end piece of a coolant tube penetrates a fuel assembly head of a nuclear reactor fuel assembly and is supported on the fuel assembly head. A lower end piece of the coolant tube is fastened to and supported by a fuel assembly foot, in particular with rods of partial lengths. A supporting skeleton therefore includes the foot and the coolant tube with spacers. The fuel assembly head and a handle are placed on the skeleton and screwed onto the coolant tube after fuel rods are pushed into meshes of the spacer.

32 Claims, 10 Drawing Sheets

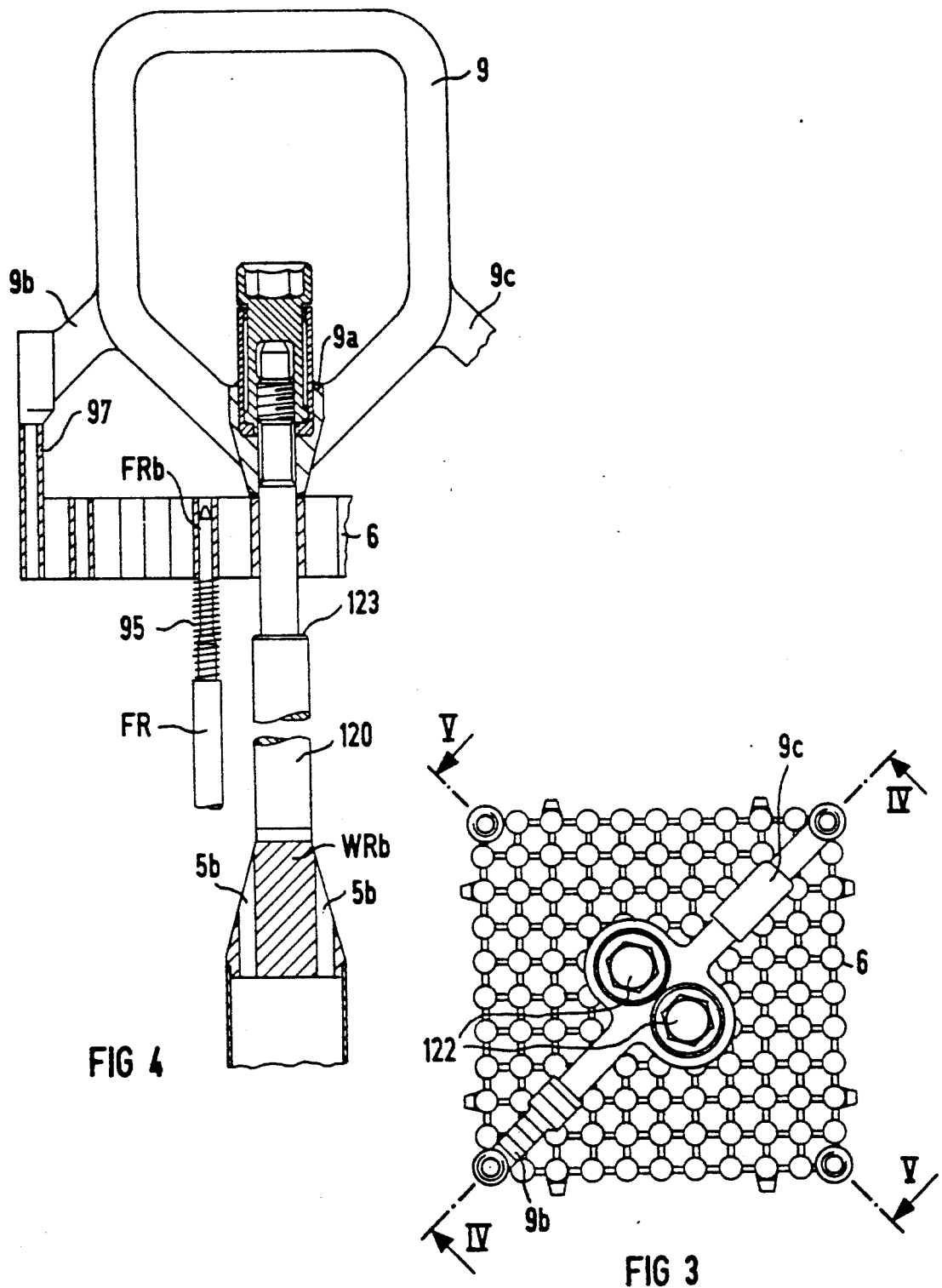

NUCLEAR REACTOR FUEL ASSEMBLY WITH A SUPPORTING COOLANT TUBE

Cross-Reference to Related Application:

This application is a continuation of International Application PCT/DE91/00168, filed Feb. 27, 1991.

The invention relates to a nuclear reactor fuel assembly, having a bundle of fuel rods being aligned parallel to one another and containing nuclear fuel; a fuel assembly head being disposed above the bundle and having a top with a handle thereon; a bottom plate being disposed under the bundle and being permeable to liquid coolant; a coolant tube being disposed in the bundle, being parallel to the fuel rods and being open on both of its ends, the coolant tube having a lower end with a lower end piece and being retained by the lower end piece on the bottom plate; and the coolant tube having an upper end piece protruding from below into a recess of the fuel assembly head.

Such a fuel assembly is known from Published European Application No. 0 307 705 A1. The end piece at the upper end of the coolant tube in that known fuel assembly is a platelike end screen with flow openings for the liquid coolant. A bolt which is parallel to the coolant tube is located on the end screen and protrudes from underneath into a recess in the fuel assembly head, where it is loosely guided without any further connection.

The end piece at the lower end of the coolant tube is also an end screen. Disposed on the outside of that end screen is a threaded bolt which is also parallel to the longitudinal direction of the coolant tube, but it also reaches through a leadthrough in a gridlike perforated bottom plate in the fuel assembly foot, where it is screwed firmly to the fuel assembly foot with a nut.

That nuclear reactor fuel assembly has gridlike spacers in a plurality of cross-sectional planes between its head and its foot. The spacers have meshes or holes, through each of which one fuel rod containing nuclear fuel extends. Some of the fuel rods are so-called bearing rods having threaded bolts on both ends, with which they are firmly screwed to the fuel assembly head with a nut and to the fuel assembly foot directly. The other fuel rods reach loosely through leadthroughs in the fuel assembly head and foot with bolts located on both ends of the rods. All of the fuel rods are fixed with a compressionally biased helical spring, and each helical spring is seated on the threaded bolt or bolt on the inside of the fuel assembly head and is supported on that end in the applicable fuel rod.

The invention also relates to a fuel assembly for a boiling water reactor with fuel rods of different lengths.

One such fuel assembly is known from U.S. Pat. No. 4,675,154 and includes a fuel assembly case that laterally surrounds the fuel assembly and is open at the top and bottom. A coolant tube extends axially inside the case and has at least one opening on each of its top and bottom end for the flow of liquid coolant. A cover plate provided with coolant outlets on the upper end of the case and a bottom plate provided with coolant inlets on the lower end of the case cover the two open ends of the case. Spacers that are at right angles to the water tube and include support ribs, extend over the cross section of the fuel assembly case in predetermined axial positions. T spacers are held on the coolant tube through suitable means (such as stops). A number of fuel rods is also provided, each of which is laterally supported on the support ribs of a plurality of spacers and need not be of uniform length.

In the case of such boiling water fuel assemblies, it is customary to construct some fuel rods as retaining rods and to screw them to the bottom and cover plates with corresponding upper and lower closure caps. If fuel rods of different lengths are provided, then the shorter fuel rods are screwed only to the bottom plate by their lower end, while their upper end is held in position by corresponding spacers.

However, at least some of the retaining rods are provided on their upper closure caps with retainers for a handle, which bear the entire weight of the fuel assembly. Additional helical springs on such upper closure caps can press the cover plate against the screw connections on the upper end pieces of the retaining rods.

Such long fuel assemblies that are constructed as retaining rods are part of the load-bearing or supporting fuel assembly skeleton and are essentially under tension. Between the handle, the cover plate and the bottom plate, they produce a force-locking, torsion-proof connection, they carry the weight of the fuel assembly and also absorb the various forces that arise upon expansion of material from the radiation and heating that prevail during operation. A force-locking connection is one which connects two elements together by force external to the elements, as opposed to a form-locking connection which is provided by the shapes of the elements themselves. Since the plates are pierced by bores, some of which form the water inlets and water outlets and some of which receive the closure caps of the fuel rods, they must be dimensioned with a correspondingly great thickness, and therefore there is only limited space available for the flow cross section of the inlets and outlets. As a result, there is a considerable pressure difference, especially at the upper cover plate, since some of the water that is pumped axially through the fuel assembly during operation evaporates, so that the mixture of water and steam would require larger outlet cross sections in order to maintain an unimpeded flow.

If the fuel assembly case is removed axially upward from the load-bearing or supporting skeleton, then the fuel rods become accessible and can be inspected from the side. However, in the event of more extensive inspection, maintenance and possible replacement of fuel rods, the cover plate must be unscrewed and the load-bearing or supporting skeleton must accordingly be dismantled. Since the screw connections generally seize after relatively long service, considerable forces are needed to release the fuel rods. Such forces can be brought to bear only at the upper closure caps of the retaining rods and must be transmitted to the screw connections of the lower closure caps by torsion on the retaining rods.

Great mechanical stability and accordingly a certain minimum thickness are therefore necessary for the rods. However, if a change is to be made from a fuel assembly having rods which are disposed in eight rows and eight columns (which is known as an 8×8 assembly) to an 11×11 fuel assembly with the same external dimensions, then thinner rods must be used, having a mechanical stability that cannot meet the requirements made for retaining rods, especially with respect to the forces necessary to release the screw connection. For economical reasons, it is generally advantageous to use a larger number of thinner rods, instead of fewer but thicker fuel rods.

It is accordingly an object of the invention to provide a nuclear reactor fuel assembly with a load-bearing or supporting coolant tube, which overcomes the hereinafore-mentioned disadvantages of the heretofore-known devices of this general type and which improves such nuclear reactor fuel assemblies, in particular by avoiding load-bearing or supporting rods with threaded bolts located on both ends that are firmly screwed to both the head and foot of the fuel assembly.

In the novel structure for the load-bearing or supporting parts of the fuel assembly skeleton, loading and forces are better distributed among the load-bearing or supporting parts, which creates new possibilities for retaining the fuel rods (and in particular shorter and/or thinner fuel rods), for simplifying assembly and disassembly of the fuel assembly, and/or for creating more favorable water inlets and water outlets with optimized pressure drops.

The invention takes the fact that the coolant tube is a relatively stable, low-wear element as its point of departure. It is suitable for transmitting relatively strong forces and practically need not be removed for inspecting or repairing the fuel assembly. With an adequately stable connection to the bottom plate, the entire weight of the fuel assembly can therefore be borne, which makes retaining rods superfluous and makes load-bearing or supporting screw connections to fuel rods unnecessary for either the bottom plate or the top plate. A rigid connection for force transmission between the coolant tube and the bottom plate can therefore be non-detachably constructed, and a seized screw connection of the tube need not be loosened for inspections. The cover plate can be practically relieved of load-bearing or supporting forces and then serves only to cover the water channel, as an upper stop for unscrewed fuel assemblies, which are then retained only by the spacers in the coolant flow, and to maintain the desired flow. With the cover plate removed, the fuel rods can be inserted or replaced without further screwing operations.

With the foregoing and other objects in view there is provided, in accordance with the invention, a nuclear reactor fuel assembly, comprising at least one coolant tube with an upper end having an opening formed therein and an upper end piece and a lower end having an opening formed therein and a lower end piece; a bottom plate being supported by said coolant tube and joined to said lower end piece in a dimensionally rigid manner, said bottom plate having inlet openings formed therein for liquid coolant; a cover plate retaining said upper end piece and having outlet openings formed therein for a liquid/steam mixture of coolant; gridlike spacers defining meshes therein, means for retaining and attaching said spacers on said coolant tube between said plates; and fuel rods each being guided through a respective one of said meshes, being filled with nuclear fuel and being joined to at most one of said plates.

In accordance with another feature of the invention, there is provided a stop body mounted on said upper end piece, said cover plate being detachably retained on said stop body, and a lower closure cap disposed on said bottom plate, said fuel rods including longer and shorter fuel rods, and only said shorter fuel rods being retained by said lower closure cap on said bottom plate.

As compared with known fuel assembly structures, the upper end piece of the coolant tube accordingly gains special significance, because it is no longer freely or only loosely guided in a recess relative to the fuel assembly head, but instead is retained on the fuel assembly head. The entire weight of the fuel assembly is then supported by the coolant tube when the handle on the fuel assembly head is raised. If additional forces arise at the fuel assembly head during manipulation (such as additional forces of gravity due to the application of the hoisting tool), they can be absorbed by springs between the head and the foot part, without uncontrollably loading the coolant tube.

With the objects of the invention in view, there is also provided a nuclear reactor fuel assembly, comprising a bundle or cluster of mutually parallel aligned fuel rods containing nuclear fuel; a fuel assembly head being disposed above the bundle and having a top with a handle; a bottom plate being disposed under the bundle and being permeable to liquid coolant; and a coolant tube being disposed in the bundle, being parallel to the fuel rods and having upper and lower open ends; the coolant tube having a lower end piece on the lower end being supportingly retained on the bottom plate for retaining the coolant tube on the bottom plate; and the coolant tube having an upper end piece on the upper end being supportingly retained on the fuel assembly head and protruding from below into a recess formed in the fuel assembly head.

In accordance with another feature of the invention, the bottom plate and the fuel assembly head are supports for the coolant tube, one of the end pieces is longitudinally displaceably supported on one of the supports, and including a stop body on the fuel assembly head defining a maximal spacing between the supports, and at least one spring disposed between the supports for pressing one of the supports against the stop body.

In accordance with a further feature of the invention, there is provided a stop shoulder formed onto the one displaceably supported end piece, the shoulder defining a minimal spacing between the fuel assembly head and the bottom plate.

In accordance with an added feature of the invention, there is provided a spring is disposed on one of the fuel rods.

In accordance with an additional feature of the invention, the spring is disposed on one of the pieces, preferably on the upper end piece.

In accordance with yet another feature of the invention, the fuel assembly head has a part being formed onto the handle, being secured against rotation, and being screwed on from above, and the upper end piece is passed through the part.

In accordance with yet a further feature of the invention, the upper end piece carries a socket pin, the fuel assembly head carries a cover plate having coolant outlet openings formed therein, and the socket pin extends through the cover plate and carries a detachably mounted stop body for the cover plate.

In accordance with yet an added feature of the invention, the cover plate is mounted on the upper end piece, and including a supporting mechanical connection securing the bottom plate to the lower end piece, a spring under pressure pressing the cover plate against the stop body, and the fuel rods having upper ends with upper closure caps, the upper closure caps being loosely guided on or not touching the cover plate in an appropriate receiving position.

As a special advantage, at least all of the fuel rods that extend practically up to the cover plate in the head of the fuel assembly carry lower closure caps on their lower ends, with which these fuel assemblies then stand, unscrewed, on the bottom plate. Accordingly, the closure caps need merely be loosely introduced into suitable plug-type connections on the bottom plate or they need merely be placed on the surface of the bottom plate pointing toward the cover plate, without using special retainers.

A lower end piece of the coolant tube is also provided, which is rigidly joined to the bottom plate so that all of the forces exerted upon the bottom plate are practically transmitted to the coolant tube. A corresponding upper end piece of the coolant tube, which also supports the cover plate, is detachably joined to the cover plate and/or to a handle secured to the cover plate.

Therefore, with the objects of the invention in view, there is additionally provided a fuel assembly of a boiling water reactor, comprising a fuel assembly case laterally surrounding the fuel assembly and having an interior and open upper and lower ends at the top and bottom; a cover plate covering the upper end of the case and having coolant outlets formed therein; a bottom plate covering the lower end of the case and having coolant inlets formed therein; a coolant tube extending in axial direction in the interior of the case and having upper and lower ends, each of the upper and lower ends having at least one opening formed therein for the passage of water, the coolant tube having a lower end piece joined to the bottom plate with a rigid connection transmitting substantially all forces exerted upon the bottom plate to the lower end piece and to the coolant tube, and the coolant tube having an upper end piece, and a releasable connection supporting the upper end piece at the cover plate; a plurality of spacers standing practically or substantially perpendicular to and retained on the coolant tube at predetermined axial positions, the spacers containing support ribs; a plurality of fuel rods being parallel to the case, being respectively supported on the support ribs of a plurality of the spacers and having lower ends, some of the fuel rods extending practically or substantially as far as the cover plate; and lower closure caps standing unscrewed on the bottom plate and being disposed on the lower ends of at least all of the fuel rods extending substantially as far as the cover plate.

In accordance with another feature of the invention, at least two of the spacers are penetrated by all of the fuel rods, the fuel rods include first and second groups of fuel rods, each of the fuel rods at least in the first group extend from the bottom plate as far as the cover plate and carry one of the lower closure caps on the lower end, the bottom plate has an upper surface facing toward the cover plate, the lower closure caps stand on the upper surface of the bottom plate, the fuel rods of the first group have upper ends, and including upper closure caps on the upper ends being loosely disposed on the cover plate at given receiving positions.

In accordance with a further feature of the invention, each of the fuel rods in the second group is shorter than a fuel rod in the first group and carries one of the lower closure caps on the lower end being retained on the bottom plate, the fuel rods of the second group have upper ends, and including upper closure caps on the upper ends being disposed in the vicinity of one of the spacers and being spaced apart from the cover plate.

In accordance with an added feature of the invention, there is provided a plug connection joining the lower closure caps of the fuel rods of the second group to the bottom plate.

In accordance with an additional feature of the invention, the coolant outlets in the cover plate are outlet openings disposed between the given receiving positions of the fuel rods of the first group and enlarged outlet openings disposed in a projection of the shorter fuel rods.

In accordance with again another feature of the invention, the fuel rods of the second group are each disposed along diagonals of the cross section of the case.

In accordance with again a further feature of the invention, the case has walls, some of the fuel rods are adjacent the walls, and each of the fuel rods adjacent the walls belongs to the first group.

In accordance with again an added feature of the invention, the support ribs of the spacers define first through eleventh rows and first through eleventh columns of meshes between the support ribs, counting from the wall inward, and the fuel rods of the second group are each disposed in the third row or the third column.

In accordance with again an additional feature of the invention, the upper end piece of the coolant tube passes through the cover plate from below and is screwed to the cover plate and/or to the handle from above.

In accordance with still another feature of the invention, the handle is undetachably secured to the cover plate.

In accordance with still a further feature of the invention, there is provided a part formed onto the bottom plate into which the lower end piece of the coolant tube is introduced, and a securing bolt securing the lower end piece to the part, to protect against relative rotation of the bottom plate and the coolant tube.

In accordance with still an added feature of the invention, the cover plate is resiliently supported against the bottom plate.

In accordance with still an additional feature of the invention, the coolant inlets in the bottom plate are flow openings having cross sections creating a uniform flow through the fuel assembly with a pressure loss being negligible as compared to a pressure loss at the coolant outlets in the cover plate.

In accordance with a concomitant feature of the invention, threadless closure caps are disposed on the upper and lower ends of all of the fuel rods.

Other features which are considered as characteristic for the invention are set forth in the appended claims.

Although the invention is illustrated and described herein as embodied in a nuclear reactor fuel assembly with a load-bearing or supporting coolant tube, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIGS. 3 is a plan view and FIGS. 4 and 5 are fragmentary longitudinal-sectional views of a fuel assembly head;

Figure 1:
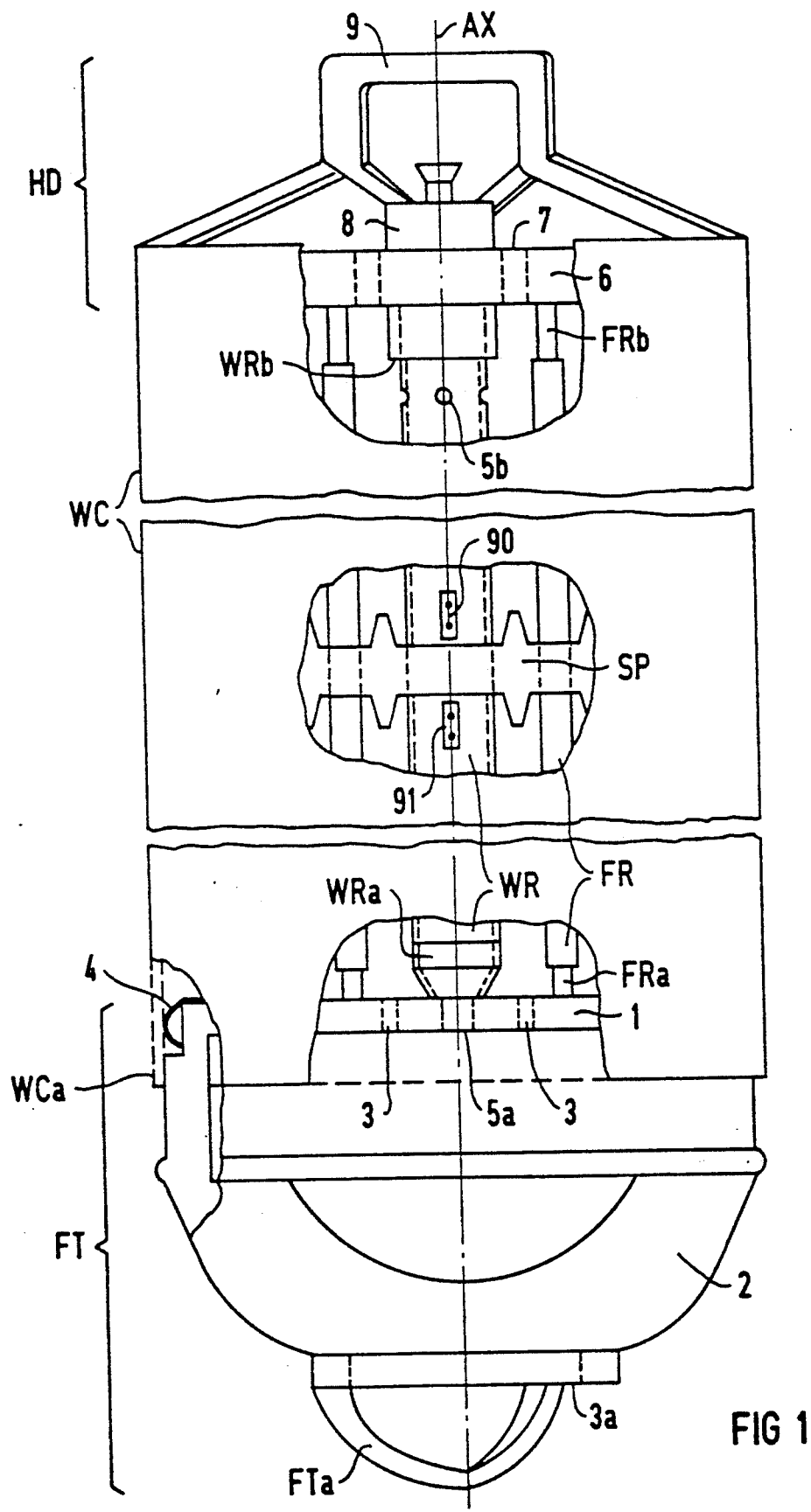
FIG. 1 is a fragmentary, diagrammatic, partly broken-away, side-elevational basic view of the most important parts of a fuel assembly for boiling water reactors.

Referring now to the figures of the drawing in detail and first, particularly, to FIG. 1 thereof, there is seen a completely assembled fuel assembly having a longitudinal axis being indicated by reference symbol AX, in a view which is not to scale.

The fuel assembly is surrounded laterally by a fuel assembly case or jacket WC, which is open at the top and bottom. A fuel assembly head or cap HD and a foot or base part FT are located there.

The foot part FT is positioned in the core of a reactor on a base grid by means of a bracket FTa. A transition piece 2 forms a flow channel that leads from an inlet opening 3a to coolant inlets 3 in a bottom plate 1 that covers the foot part or the lower end of the fuel assembly. A lower edge WCa of the fuel assembly case WC is supported against and largely sealed off from the foot part FT and its bottom plate 1 by means of a sealing spring 4.

A coolant tube or "water tube" WR extends axially through the interior and preferably the center of the case WC. The coolant tube WC has one respective end piece WRa, WRb and respective openings 5a, 5b for the passage of coolant (water) at its lower end upper ends. The fuel assembly head HD and the bottom plate 1 are supports for the coolant tube WR.

Spacers SP are mounted on the coolant tube at predetermined axial positions between retaining means in the form of stop bodies 90, 91. The spacers SP are at right angles to the tube WR and include support ribs. These support ribs form a grid with meshes or holes, which may be formed, for instance, from sheets that are welded together or from lengthwise and crosswise ribs that meet one another at right angles. Supported on these ribs are a number of fuel rods FR. Each of the fuel rods FR is parallel to the case, passes through the meshes of a plurality of spacers and carries closure caps FRa, FRb at the bottom and top.

The fuel assembly head HD has a cover plate 6, which covers the fuel assembly case WC on the top and has coolant outlets 7. A handle 9 is disposed on the upper surface of the cover plate, and the cover plate 6, the handle 9 and the upper end piece WRb of the coolant tube are held together by a connecting part 8 that is constructed as a stop body.

The fuel rods FR are firmly clamped substantially within the meshes of the spacers. The bottom plate 1 and the cover plate 6 serve only as stops that prevent major axial motions of the rods. The closure caps of the fuel rods therefore have no thread with which they would be screwed to the plates.

Instead, the fuel rods stand on the bottom plate with their lower closure caps, and are also only loosely guided by the upper closure caps in appropriate receiving positions on the cover plate.

Figure 2:
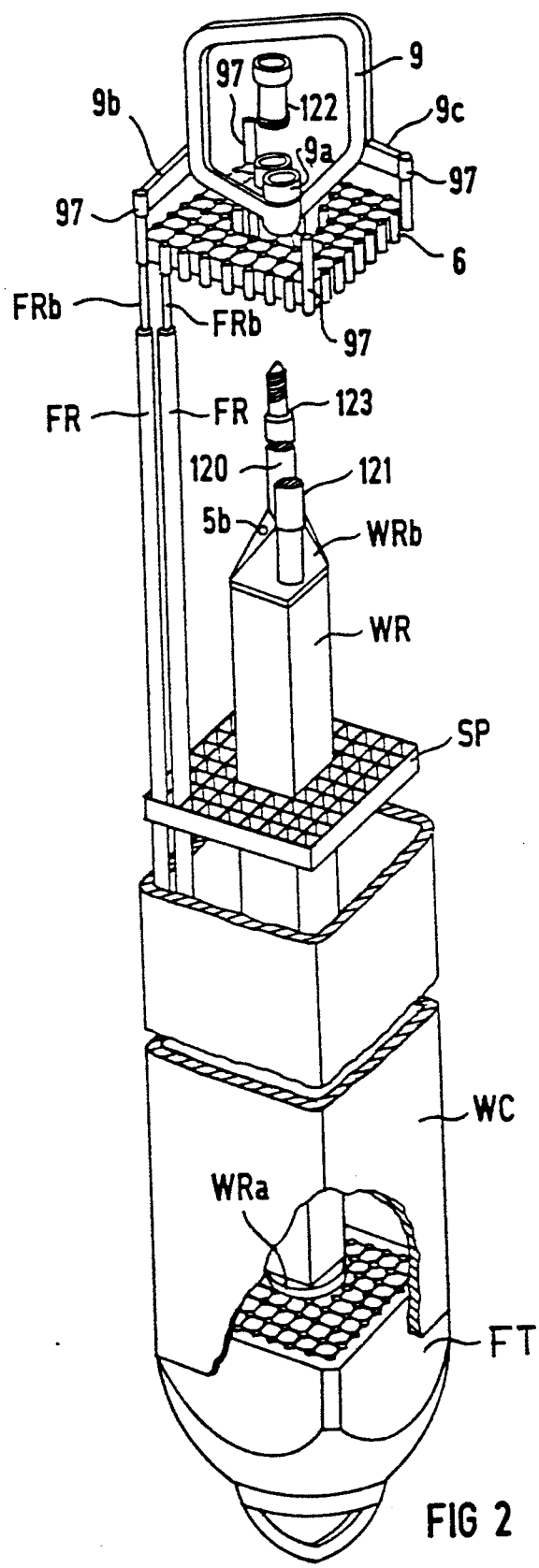
FIG. 2 is a partly broken-away and exploded perspective view of a skeleton of a first embodiment of the invention.

The nuclear reactor fuel assembly of FIG. 2 has a fuel assembly head with a cover plate 6 and a fuel assembly foot part FT, each having a rectangular (in this case square) cross section, an elongated coolant tube WR with a cross-shaped, round or rectangular (in this case square) cross section, and an elongated fuel assembly case WC, which likewise has a rectangular (square) cross section. The coolant tube WR is disposed centrally in gridlike spacers SP, which are located inside the fuel assembly case and are spaced apart from one another, as seen in the longitudinal direction of the coolant tube. One fuel rod FR containing nuclear fuel reaches through each mesh or space of these spacers SP. These fuel rods loosely engage leadthroughs in the fuel assembly head and the fuel assembly foot with bolts that are formed on both ends by closure caps FRa, FRb.

As can be seen in FIG. 4, all of the fuel rods are fixed in helical springs 95 which are biased for pressure. These springs are seated on the bolt on the lower surface or underside of the fuel assembly head and are supported on that lower surface and on the applicable fuel rod FR.

While the fuel assembly head and foot are formed of stainless steel, the elongated fuel assembly case WC is manufactured from a zirconium alloy. The fuel assembly case WC is open on both ends and is fitted at one end over the cover plate 6 and at the other end over the fuel assembly foot FT. The fuel assembly case accordingly engages the fuel assembly head and foot laterally. On the non-illustrated upper end, the fuel assembly case has sheet-metal strips pointing inward at the corners, which are firmly screwed to stay bolts 97 on the top of the cover plate 6 in the head.

The coolant tube WR having the rectangular or square cross section is likewise formed of a zirconium alloy. The sides of the cross section of the coolant tube WR are parallel to the respective adjacent side of the cross section of the fuel assembly case.

The ribs of the spacers intersect one another at right angles and are each likewise parallel to two mutually parallel sides of the cross section of the coolant tube WR. All of the sides of the coolant tube cross section are spaced apart from the respective adjacent side of the cross section of the fuel assembly case WC by the same distance.

The coolant tube is closed on the upper end with a first end piece WRb and on the lower end with a second end piece WRa. Both end pieces are likewise made of a zirconium alloy and are firmly welded to the coolant tube. The upper end piece WRb has two flow openings 5b for the coolant extending longitudinally of the coolant tube, which are best seen in FIG. 4, while the second end piece on the lower end is provided with a flow opening for the coolant which extends longitudinally of the coolant tube but cannot be seen in FIG. 2.

Figure 5:
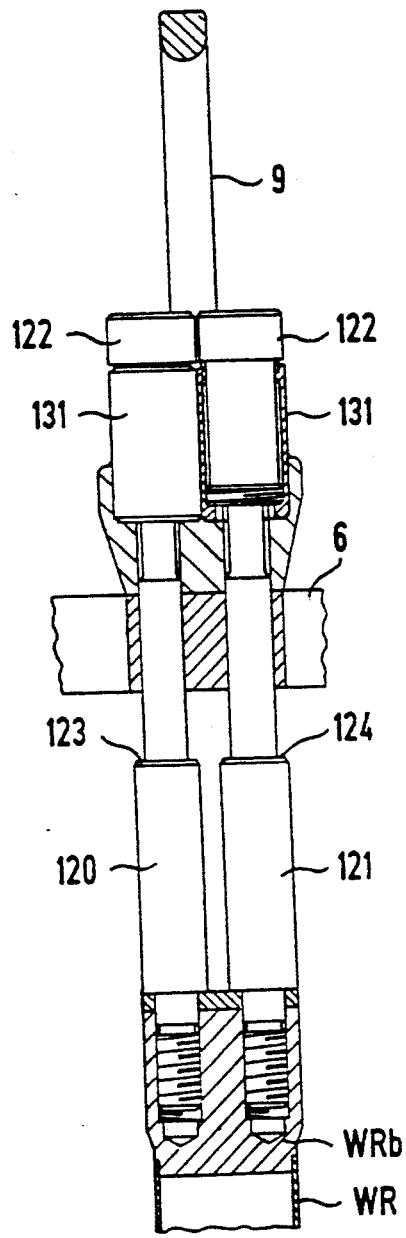

The first end piece WRb on the upper end of the coolant tube has two stay bolts 120 and 121, which have different outside diameters and are each provided with a thread. The threads engage the cover plate 6 and the handle 9 on the outside of the fuel assembly head along a diagonal of the fuel assembly head. The handle 9 has a central part 9a to be screwed to the coolant tube and two lateral cantilever arms 9b, 9c, which are supported on the top of the fuel assembly head and are firmly screwed to two diagonally opposed stay bolts 97 between these stay bolts and the aforementioned sheet-metal strips in the corner of the fuel assembly case WC. Each of the handle and the fuel assembly head are firmly screwed onto the threaded bolts 120 and 121 on the top of the fuel assembly head with a union nut 122, until they meet shoulders 123 and 124 on the stay bolts 120 and 121, as shown in FIG. 5. Due to the two stay bolts, the head part is firmly screwed to the coolant tube in such a manner as to be secure against rotation. Since the stay bolts 120 and 121 have different outside diameters, it is assured that the fuel assembly head will always be firmly screwed to the water tube WR in the same angular position with respect to the longitudinal axis of the water tube.

Figure 8:
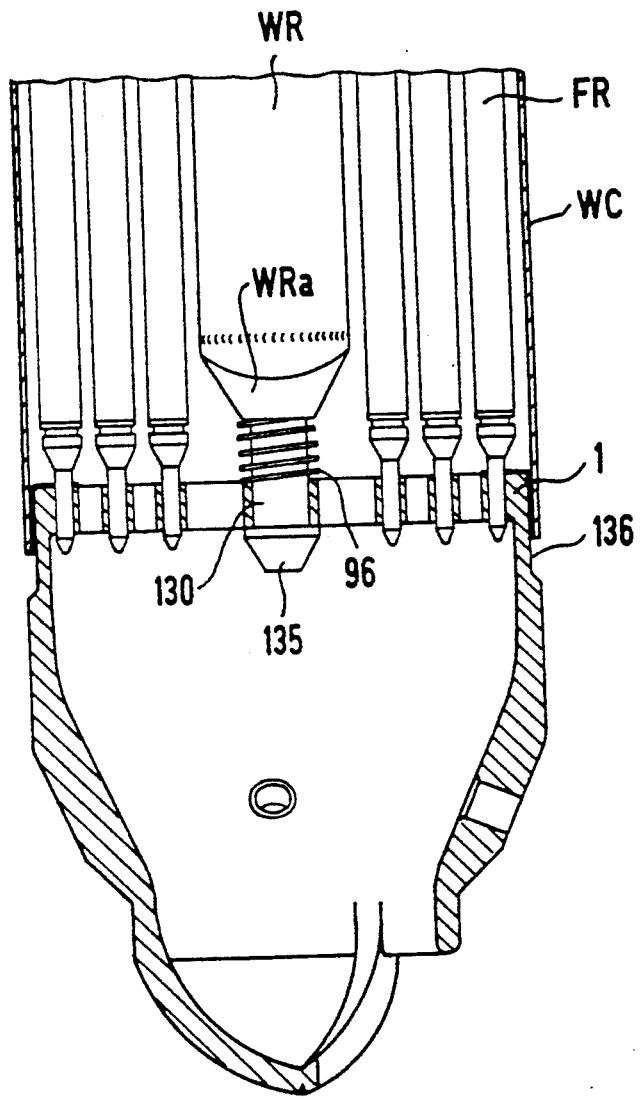
FIG. 8 is a fragmentary, longitudinal-sectional view of a fuel assembly foot.

As is seen in FIG. 8, the second end piece WRa on the lower end of the coolant tube WR, has a threaded bolt 130 on the top of the fuel assembly foot, which reaches through a leadthrough of the gridlike bottom plate 1, where it is firmly screwed with a nut until it meets.

In a boiling water nuclear reactor, the nuclear reactor fuel assembly of FIG. 2 is vertically disposed, and a coolant that is formed of a two-phase mixture of water and steam flows through it in the fuel assembly case. Water enters the fuel assembly case 5 through the gridlike grate of the fuel assembly foot part having the bottom plate 1, into the fuel assembly case 5, and wet steam exits from the fuel assembly case through a gridlike grate of the fuel assembly head having the cover plate 6. Only water in the liquid phase is located in the coolant tube and effects increased reactivity in the reactor core of the boiling water reactor.

Figure 6:
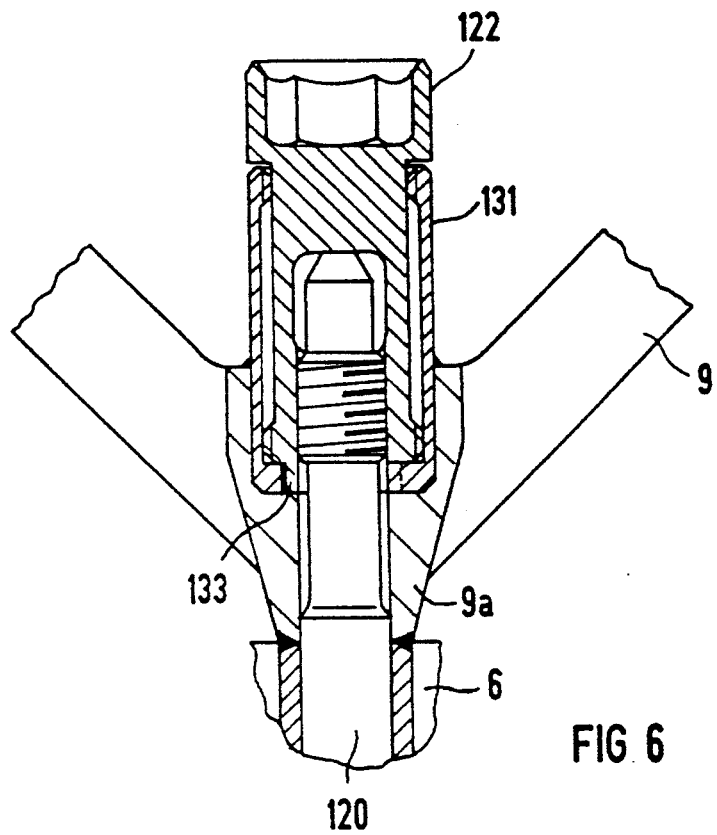
FIG. 6 is a fragmentary, enlarged, longitudinal-sectional view of a portion of FIG. 4.

In a further feature of the nuclear reactor fuel assembly, as is shown in FIGS. 4 and 6, the lengths of the stay bolts 120 and 121 protruding past the shoulders 123 and 124 on the upper end piece WRb of the coolant tube, are selected to be so large that the fuel assembly head and handle are not retained in contact with the shoulders 123, 124, but instead the fuel assembly head is displaceable counter to the spring force of the compression springs 95 seated on the fuel rods with respect to this end piece WRb. The compression springs 95, which are constructed as helical springs, have one end supported on the cover plate 6 of the fuel assembly head and another end supported on the fuel rods and therefore on the bottom plate 1 of the fuel assembly foot. The compression springs can thus resiliently intercept any displacement of the handle and of the fuel assembly head, for example from forces of gravity in the direction of the shoulders 123 and 124. The shoulders 123 and 124 are advantageously located between the fuel assembly head and the engagement point of the compression springs 95 on the fuel rods FR, so that these compression springs are not subject to blocking, if the fuel assembly head strikes the shoulders 123 and 124 of the stay bolts 120 and 121 acting as stop bodies.

Figure 7:
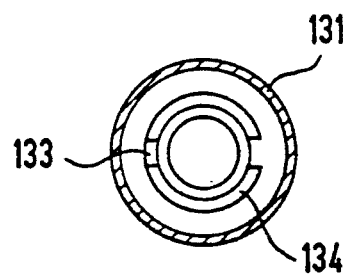
FIG. 7 is a cross-sectional view of a contact surface in the portion of FIG. 6.

The union nuts 122 on the stay bolts 120 and 121 that are located on the upper surface of the fuel assembly head are also stop bodies on the upper end piece. These union nuts define an initial position of the fuel assembly head or cover plate 6. They are each guided in a respective sheath 131 located on the handle 9. The union nuts 122 each have a tang 133 acting as a locking device on the bearing surfaces thereof that are disposed on the handle 9. As is seen in FIG. 7, the tangs each lock into place in an annular groove 134 serving as a counterpart locking device, on the bearing surface of the handle 9 on the union nut 122. As a result, the locking of the union nuts 122 to the handle 9 can be released only if a weight, for instance, acts upon the handle (or the fuel assembly head) in the direction of the fuel assembly foot, and a separating motion between the union nuts 122 and the handle takes place in the longitudinal direction of the stay bolt and counter to the spring force of the compression springs 95.

Advantageously, the stay bolts 120 and 121 are firmly screwed to the upper end piece of the coolant tube WR, so that they can be replaced without further action being required, for instance if their threads on the outside of the fuel assembly head 2 are damaged.

Non-illustrated compression springs, which may be helical springs, for instance, and are supported on the fuel assembly head and on the shoulders 120 and 121, may also be mounted on the stay bolts 120 and 121.

As FIG. 8 shows, the threaded bolt 130 of the end piece WRa on the lower end of the coolant tube may reach through the bottom plate 1 of the fuel assembly foot part and may be displaceable counter to the spring force of a compression spring 96, that is constructed as a helical spring, with respect to the fuel assembly foot. This compression spring 96 is mounted on the threaded bolt 130 of the lower end piece WRa and has one end supported on the end piece and therefore on the fuel assembly head and another end supported on the fuel assembly foot. The fuel assembly head and the handle 9 can then be firmly screwed until they meet the respective shoulders 123 and 124 of the stay bolts 120 and 121. The compression spring 96, which is subject to blocking and is disposed on the inside of the fuel assembly foot, serves on one end as a stop body for the end piece on the fuel assembly foot, and on the other end, a nut 135 which is seated on the stay bolt 130 and is screwed onto the fuel assembly foot from below serves as a stop body and thus defines an initial position for the fuel assembly foot.

As FIG. 8 shows, the fuel assembly case WC that is firmly screwed to the fuel assembly head may be displaced on a jacket surface 136 of the fuel assembly foot, along with the fuel assembly head, in the longitudinal direction of the fuel assembly case.

Figure 9:
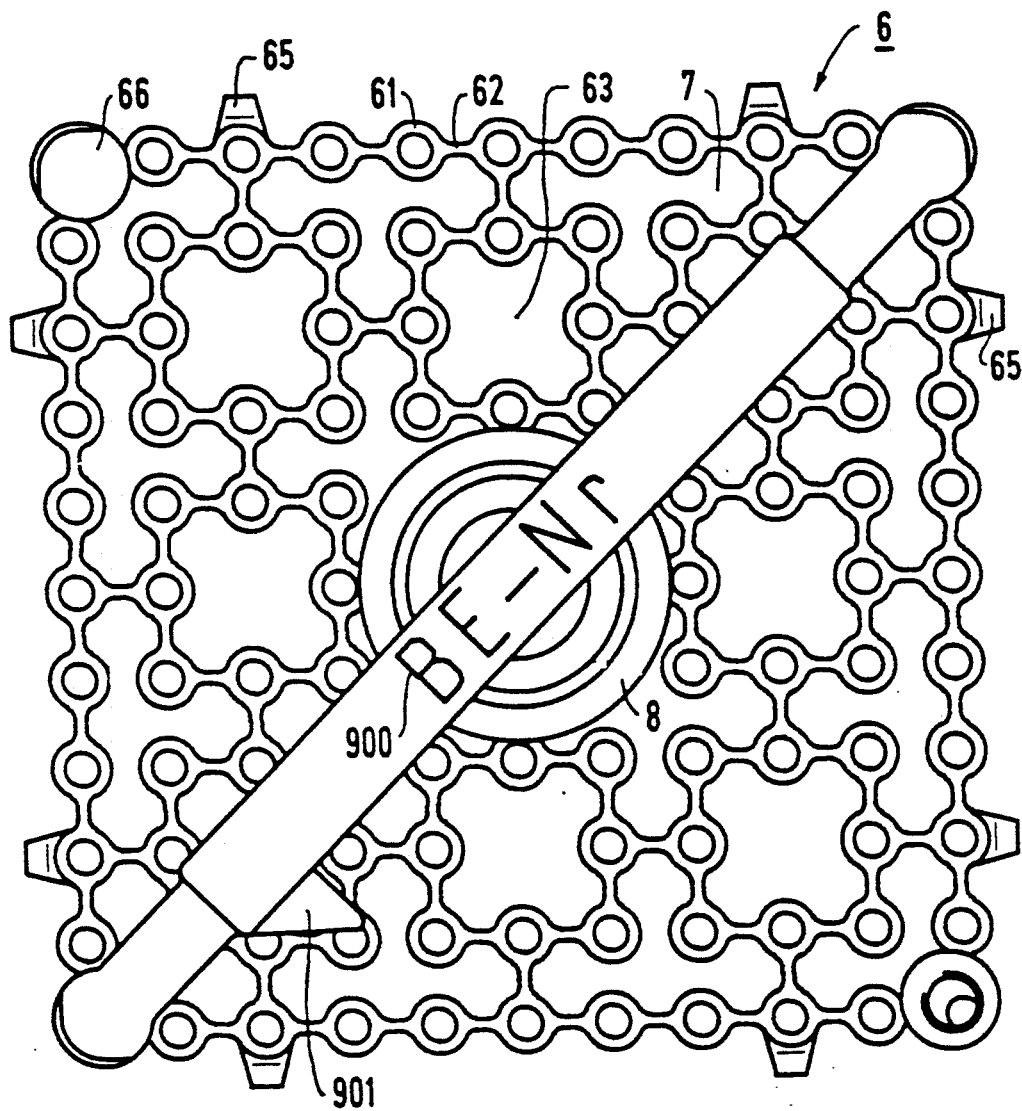
FIGS. 9 and 10 are respective plan and fragmentary, longitudinal-sectional views of the fuel assembly head of a different exemplary embodiment.

In the cover plate 6 shown in FIG. 9, the positions of the fuel rods can be shown as center points of meshes in a grid with square meshes. A central region of $3 \times 3$ meshes is intended to receive a square coolant tube ("water tube") and is covered by a connecting part 8 for a load-bearing or supporting connection between the cover plate and the water tube. Since it is advantageous for only some of the fuel rods to extend practically over the entire length between the bottom plate and the cover plate, while the other rods are shorter and carry an upper closure cap on the upper end, are already located in the vicinity of a spacer and are spaced apart from the cover plate, the water outlet in the cover plate is formed by outlet openings 7 that are located between the positions of long fuel rods, and by enlarged outlet openings 63 which are disposed in the projection or imaginary extension of the shorter fuel rods. Since screw connections between the cover plate and the fuel rods are to be avoided, the upper closure caps FRb of the longer fuel rods end in the form of smooth, unthreaded bolts, which are only loosely disposed in sleeves 61 at the corresponding positions on the cover plate. Accordingly, the cover plate is not strained by the weight of the fuel rods. Instead, it merely prevents an axial displacement of the fuel rods exceeding a predetermined play. The sleeves 61 that are disposed at the appropriate receiving positions of long fuel rods, are joined together by ribs 62. The cover plate can therefore be made so thin and permeable that the coolant can pass through it virtually unhindered. By suitable dimensioning of the inlet openings 3 in the bottom plate, a uniform flow through the fuel assembly can be achieved, and the pressure loss at the cover plate can be negligible as compared to the pressure loss of the coolant as it flows through the bottom plate and the fuel assembly.

At least most of the enlarged outlet openings, that is most positions of the shorter fuel rods, are advantageously each located on the diagonal of the case cross section. Fuel rods that are adjacent to the case wall preferably belong to the group of the long fuel rods. It is particularly with a fuel assembly in which the support ribs of the spacers form 11 rows and 11 columns, that the shorter fuel rods are each disposed in the third row or the third column (counting from the case wall inward), as can be seen in FIG. 9.

The cover plate is supported on the case wall and on its rounded corners by lateral bearing lugs 65 and reinforcements 66 of corner sleeves.

The handle 9 may have markings 900, 901, which serve to identify the individual fuel assembly and to define right and left, in particular if the fuel fillings in the various fuel rods are different for individual fuel assemblies and their parts.

A load-bearing or supporting connection between the handle 9 and the cover plate 6 is advantageously achieved if these two parts are constructed integrally, for instance as a cast workpiece. The head HD formed by the handle and the cover plate need merely be screwed through the connecting part 8 to the upper end piece WRb of the water tube, in order to achieve a load-bearing or supporting mechanical connection with the water tube.

Figure 10:
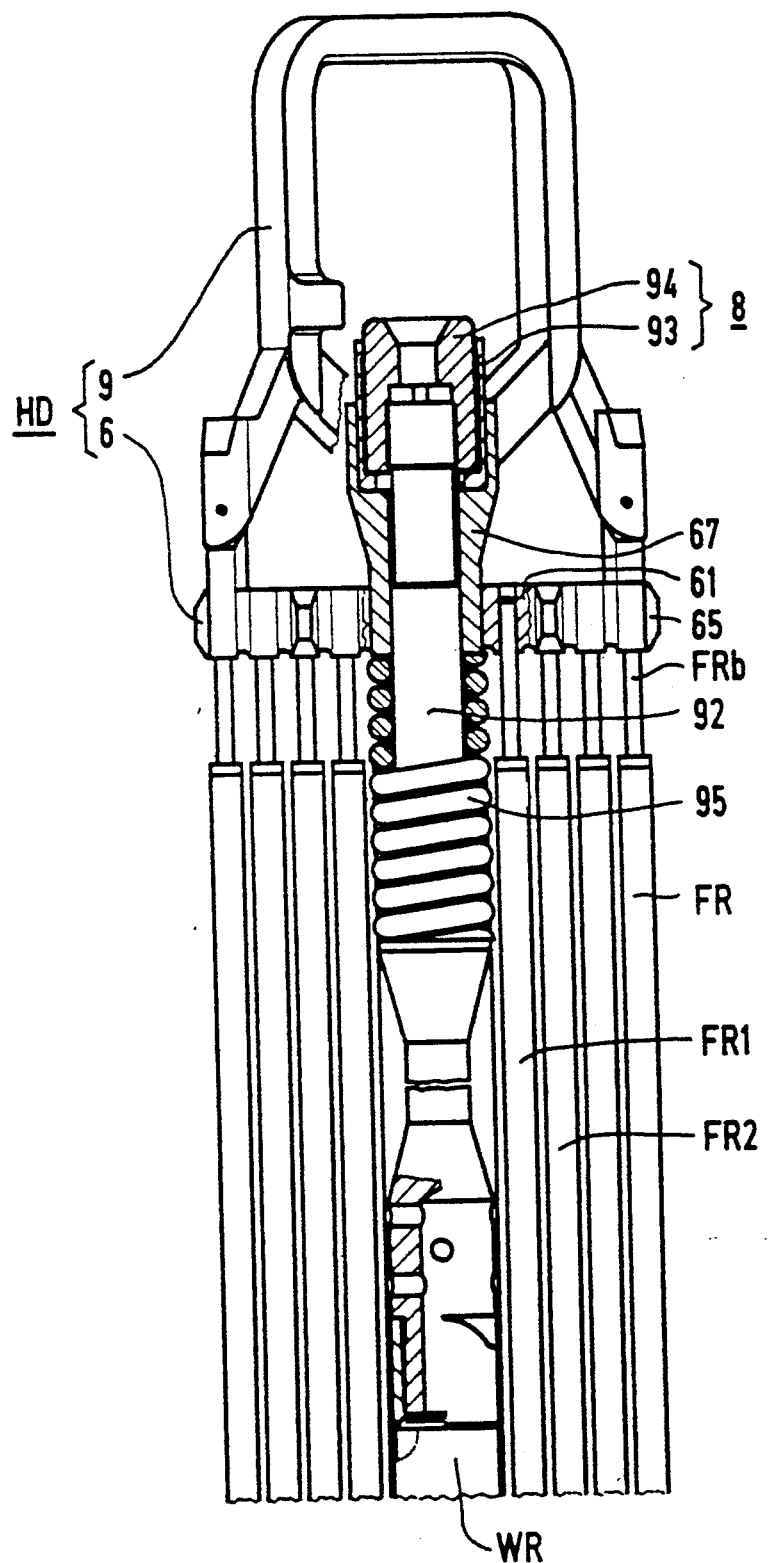

A part in the form of a collar 67 shown in FIG. 10 is formed onto the handle, and the upper end piece WRb of the water tube is constructed as a socket pin 92 that is passed through the cover plate and welded to the water tube. This socket pin carries a male thread 93 on its upper end that is passed through the collar, and a union nut 94 is screwed onto this thread from above.

The cover plate is supported against the bottom plate by the helical spring 95 that is subject to compression and that advantageously is disposed on the upper end piece or pin 92 between the water tube and the cover plate. If the cover plate is therefore held down counter to the compressive force of the helical spring 95, then the union nut 94 can be screwed onto the male thread 93 of the socket pin 92 up to a desired end position. When the helical spring 95 is relieved, they then form the stop for the collar 67 and the cover plate 6.

A securing cap which is also disposed between this collar 67 and the union nut 94, has an upper end that fits partway around the union nut 94 and secures it against falling out. If the helical spring 95 is relieved in the end position, then corresponding profiles of the collar 67 and therefore of the nut 94 mesh with one another and prevent the union nut 94 from being able to rotate relative to the socket pin 92.

By using the fuel rod FR1 as an example, it is seen that its upper closure cap FRb is only loosely guided with a certain lateral play in the corresponding sleeve 61. In the illustrated embodiment of these closure caps, the fuel rods (together with the water tube) can also be moved longitudinally counter to the force of the helical spring 95, in order to compensate for an expansion of material such as can occur from radiation and heating during reactor operation. The union nut 94 then serves as a stop body on the upper end piece WRb of the coolant tube and fixes the maximal elongation of the spring 95 and therefore the maximum spacing between the fuel assembly head with the cover plate 6 and the foot part with the bottom part 1.

Figure 11:
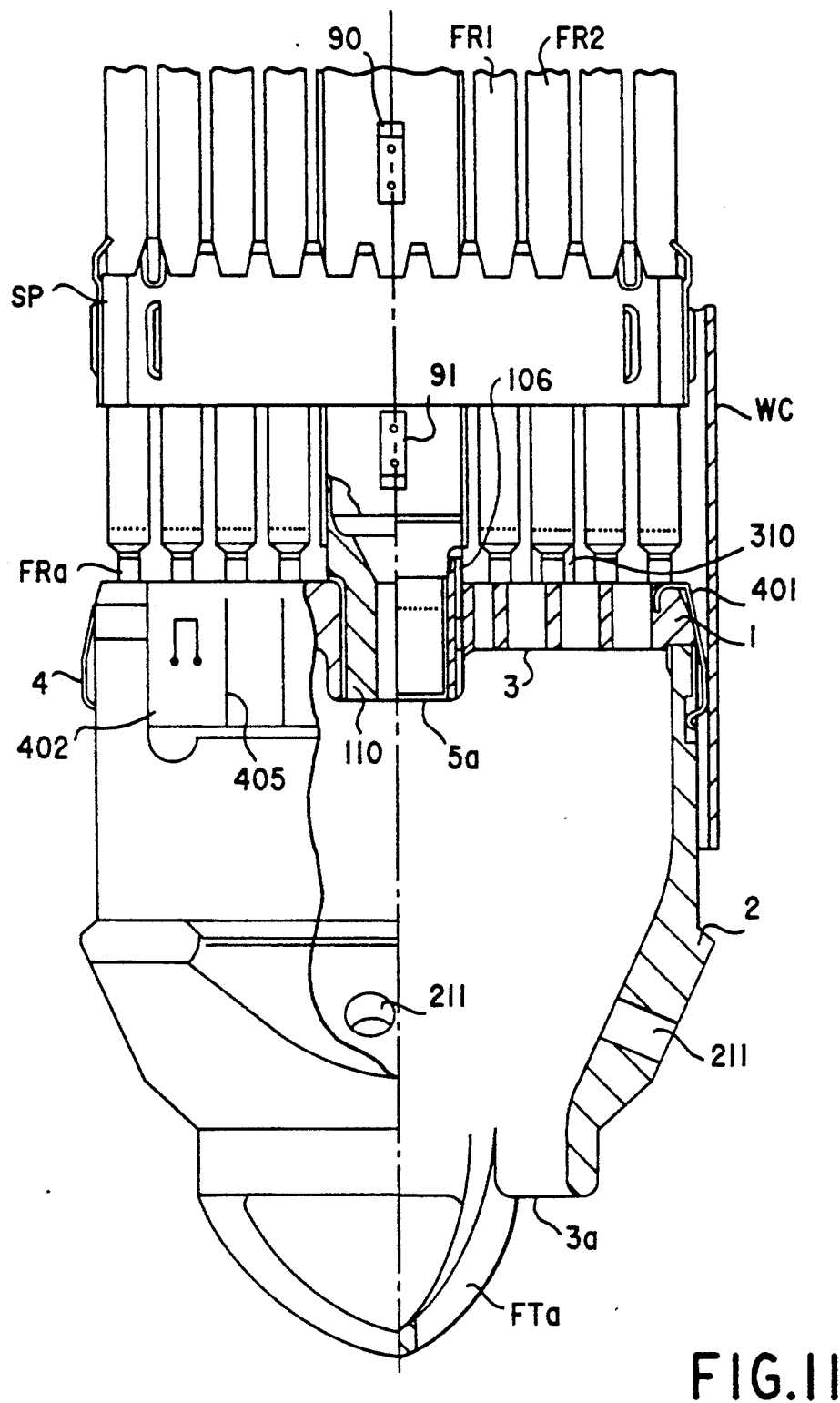
FIG. 11 is a fragmentary, longitudinal-sectional view of the region of the foot part of a fuel assembly according to the invention.

In the longitudinal section of FIG. 10, a fuel rod FR2 is seen directly next to the long fuel rod FR1. The fuel rod FR2 is disposed in a row behind the fuel rod FR1, because the position located directly next to the rod FR1 is occupied by a short rod, that is not visible in FIG. 10. The upper closure caps FRb do not carry any screw thread. This is particularly true for the lower closure caps FRa as well, which are visible in FIG. 11 and which stand unscrewed on the bottom plate 1, as is shown in FIG. 11. This bottom plate is joined rigidly and in a load-bearing or supporting manner to the lower end piece WRa of the water tube, so that the bottom plate and the weight of the fuel rods standing on it is supported practically completely by the end piece of the water tube and is transmitted to the cover plate and the handle 9 through the releasable and force-locking connection of the upper water tube end piece WCb.

The lower end piece WRa, with an end pin that is constructed as a tube piece 110, engages the bottom plate 1 and the foot part FT of the fuel assembly. It is screwed there and secured against rotation by a securing bolt 106, which engages a recess of the end piece WRa.

The lower closure cap FRa of a long fuel rod FR1 can stand on the bottom plate or it can be loosely guided in appropriate receiving openings. At least for the short fuel rods, a plug connection is provided, for example a base 310 that is constructed as a bayonet mount, having an inside which is engaged by an appropriate adaptor on the lower closure cap of the short fuel rod and which can be locked by a quarter turn, like a plug connection. With the exception of the screw connection between the water tube and the bottom plate, there are accordingly no further screw connections on the foot part. The foot part itself includes the transition piece 2, which has a lower end with star-shaped brackets FTa and an opening 3a and forms a flow channel that is covered on its upper end by the bottom plate 1 with the water inlets 3, through which the coolant enters the interior of the fuel assembly.

The lower edge WCa is supported and sealed off from the lateral upper edge of the foot part FT by a sealing spring 4. In the left-hand part of FIG. 11, which shows a side view of the foot part, a lower long side 402 of the sealing spring 4 can be seen. The lower long side 402 is feathered by slits 405, while another long side 401 is bent around an edge between the bottom plate and the transition piece.

Since this sealing spring largely prevents an uncontrolled flow of coolant between the foot part and the fuel assembly case, the coolant stream can be split in a defined manner into partial streams flowing inside and outside the case WC, by means of suitable dimensioning of the inlet openings 3 and lateral outlet channels 211.

In the present construction, the fuel assemblies are held in a skeleton having a load-bearing or supporting spine which is the water tube. The fuel rods are not part of the skeleton, and the bottom plate does not include any threaded bores for receiving the fuel assembly closure caps. The bottom plates there need merely form suitable stops, on which the closure caps are seated, but can otherwise be constructed freely. In particular, the inlet openings 3 may, for instance, be constructed as narrow slits or in some other way, so that they are not permeable or passable to relatively large foreign bodies. In that event, the bottom plate acts as a sieve at which broken-off pieces or other foreign bodies of certain dimensions are retained, so that they cannot travel into the interior of the fuel assembly and impede the coolant stream there.

The water tube WR in FIG. 11 also has stop bodies 90, 91, each of which defines the axial position of one spacer SP. In order to mount these spacers, one stop body is secured to the water tube at a time, for instance by spot welding, beginning at one end of the water tube. Next, from the other, free end, the appropriate spacer is shoved up to the level of the already secured stop body and is retained there by then securing the other stop body to the water tube on the opposite side of the spacer.

In this way, all of the spacers can be successively secured to the water tube, as long as at least the upper or lower end of the water tube is still accessible.

Before the load-bearing or supporting skeleton is mounted in final form by screw connections of the water tube and the head part, the fuel rods are inserted into the meshes of the various spacers. The final installation of the load-bearing or supporting skeleton takes place then, by screwing the head part onto the water tube, with the fuel rods being introduced into their appropriate receiving positions on the cover plate from below. Then, the fuel assembly case need merely be slipped over this, the rods and the skeleton. As a result, the installation and dismantling of the fuel assembly and replacement of the fuel rods are reduced to a few simple manipulations. In particular, the fuel rods need not be screwed into the bottom plate and unscrewed from it.

Figure 12:
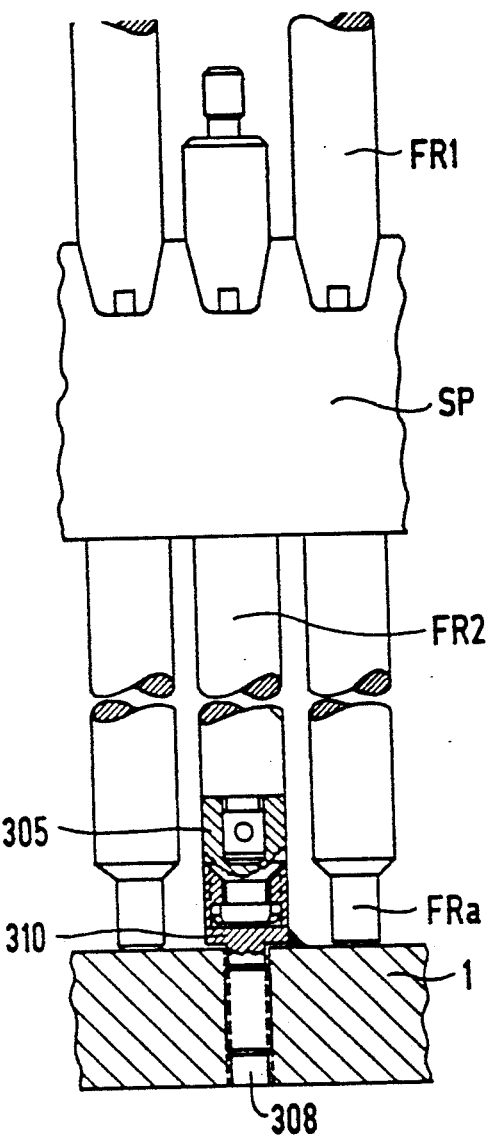
FIG. 12 is a fragmentary, longitudinal-sectional view of parts of the fuel assembly having long rods and one shorter rod.

In FIG. 12, the bottom plate 1 is shown with the closure caps FRa of the long fuel rods standing on them and with the base 310 secured to the bottom plate. The profile of the base is engaged by a profiled extension of the lower closure cap of a shorter fuel rod, serving as an adaptor 305. The base 310 is retained in a bore 308 in the bottom plate.

Figure 13:
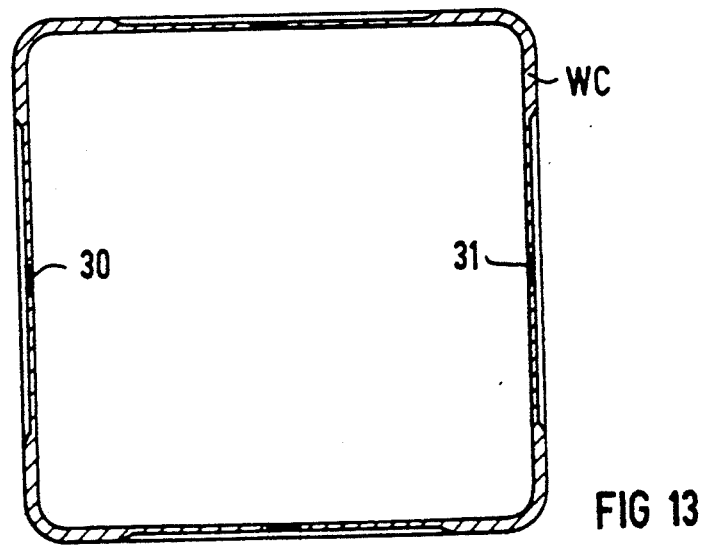
FIG. 13 is a cross-sectional view of a fuel assembly case.

The shorter fuel rods also preferably extend over at least the lower third and, for instance, the lower half of the fuel assembly, so that all of the fuel rods extend through the meshes of the lower spacers. In FIG. 12, one of the spacers SP is shown in the upper part of the fuel assembly. The upper closure cap of a shorter fuel rod ends into its vicinity, while the longer fuel rod extend extends as far as the fuel assembly head. The fuel assembly case preferably has a square cross section and the thickness of its side walls is reduced, at least in some axial regions of the fuel assembly, as is shown in FIG. 13. It may be composed of a plurality of parts, and the side walls have weld seams 30, 31, which serve partly as reinforcements and partly to connect profiled parts.

Figure 14:
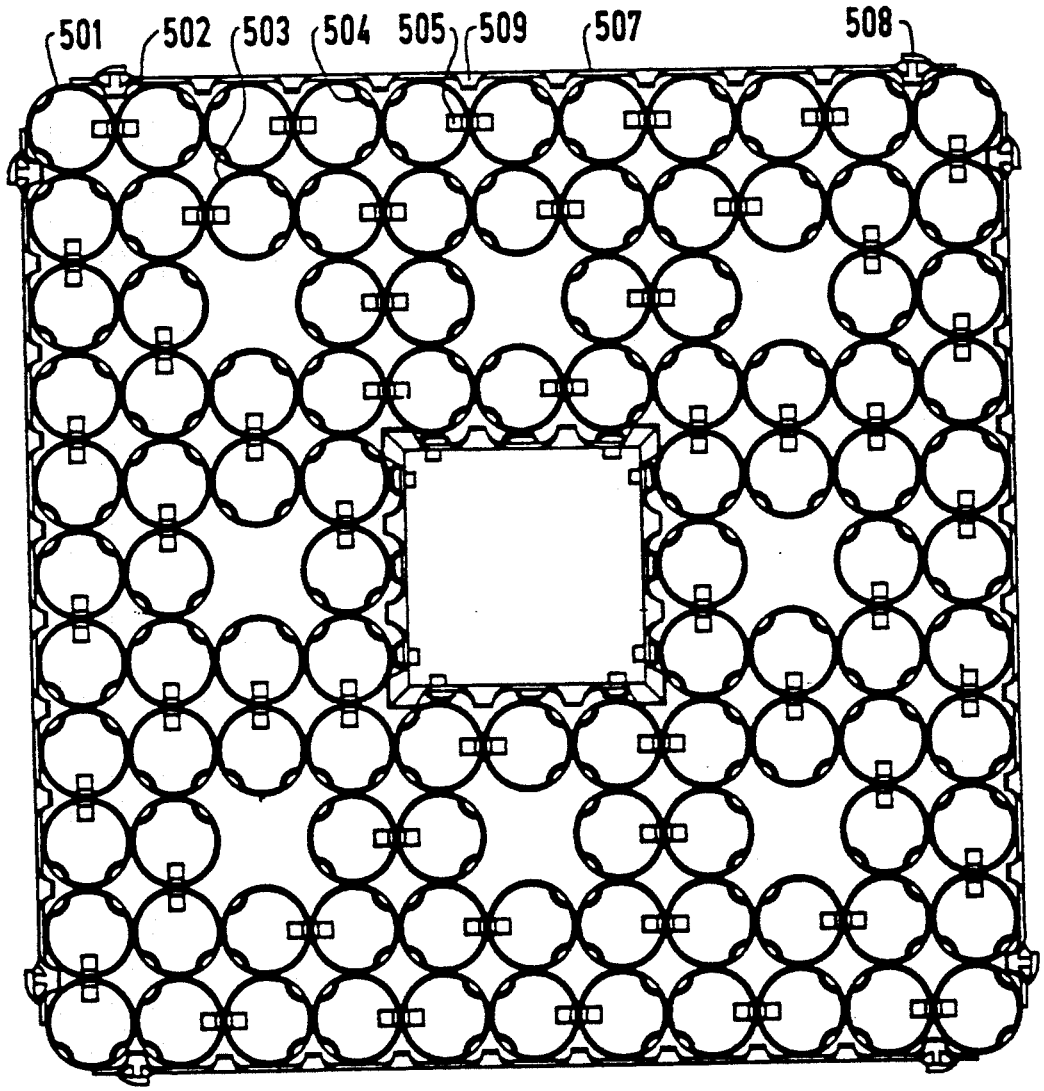
FIG. 14 is a plan view of a spacer of the fuel assembly according to the invention.

FIG. 14 shows the uppermost spacer, which is located under the cover plate of such a fuel assembly having shorter and longer fuel rods. The support ribs for supporting the fuel rods are constructed as annular sheaths 501, 502, 503, which are secured to one another and carry support knobs 504 and support springs 505 for supporting the fuel rods. Outer ribs 507 are supported by peripheral knobs 508 on the fuel assembly case and carry lugs 509 that face into the interior of the fuel assembly.

In this way, a fuel assembly that is very stable mechanically is created. It is assembled from only a few parts in a simple manner and can be easily inspected and dismantled.

What is claimed is:

1. A nuclear reactor fuel assembly, comprising:
   a) at least one coolant tube with an upper end having an opening formed therein and an upper end piece and a lower end having an opening formed therein and a lower end piece;
   b) a bottom plate being supported by said coolant tube and joined to said lower end piece in a dimensionally rigid manner, said bottom plate having inlet openings formed therein for liquid coolant;
   c) a cover plate retaining said upper end piece and having outlet openings formed therein for a liquid/steam mixture of coolant;
   d) gridlike spacers defining meshes therein, means for retaining said spacers on said coolant tube between said plates; and
   e) a plurality of fuel rods each being guided through a respective one of said meshes, each of said fuel rods being filled with nuclear fuel and each of said fuel rods being joined to at most one of said plates.

2. The fueld assembly according to claim 1, including a stop body mounted on said upper end piece, said cover plate being detachably retained on said stop body, and a lower closure cap disposed on said bottom plate, said fuel rods including longer and shorter fuel rods, and only said shorter fuel rods being retained by said lower closure cap on said bottom plate.

3. A nuclear reactor fuel assembly, comprising:
   a) a bundle of mutually parallel fuel rods containing nuclear fuel;
   b) a fuel assembly head being disposed above said bundle and having a top with a bundle;
   c) a bottom plate being disposed under said bundle and being permeable to liquid coolant; and
   d) a coolant tube being disposed in said bundle, being parallel to said fuel rods and having upper and lower open ends;
   e) said coolant tube having a lower end piece on said lower end being supportingly retained on said bottom plate for retaining said coolant tube on said bottom plate; and
   f) supporting means for attaching said coolant tube to said fuel assembly head, said coolant tube having an upper end piece on said upper end being supportingly retained on said fuel assembly head and protruding from below into a recess formed substantially in a center portion of said fuel assembly head, said supporting means consisting essentially of said upper end piece and said recess.

4. The fuel assembly according to claim 3, wherein said bottom plate and said fuel assembly head are supports for said coolant tube, one of said end pieces is longitudinally displaceably supported on one of said supports, and including a stop body on said fuel assembly head defining a maximal spacing between said supports, and at least one spring disposed between said supports for pressing one of said supports against said stop body.

5. The fuel assembly according to claim 4, including a stop shoulder formed onto said one displaceably supported end piece, said shoulder defining a minimal spacing between said fuel assembly head and said bottom plate.

6. The fuel assembly according to claim 4, wherein said spring is disposed on one of said fuel rods.

7. The fuel assembly according to claim 4, wherein said spring is disposed on one of the said pieces.

8. The fuel assembly according to claim 4, wherein said spring is disposed on said upper end piece.

9. The fuel assembly according to claim 3, wherein said fuel assembly head has a part being formed onto said handle, being secured against rotation, and being screwed on from above, and said upper end piece is passed through said part.

10. The fuel assembly according to claim 3, wherein said upper end piece carries a socket pin, said fuel assembly head carries a cover plate having coolant outlet openings formed therein, and said socket pin extends through said cover plate and carries a detachably mounted stop body for said cover plate.

11. The nuclear reactor fuel assembly according to claim 10, wherein said cover plate is mounted on said upper end piece, and including a supporting mechanical connection securing said bottom plate to said lower end piece, a spring under pressure pressing said cover plate against said stop body, and said fuel rods having upper ends with upper closure caps.

12. The nuclear reactor fuel assembly according to claim 11, wherein said upper closure caps are loosely guided on said cover plate in an appropriate receiving position.

13. The nuclear reactor fuel assembly according to claim 11, wherein said upper closure caps do not touch said cover plate in an appropriate receiving position.

14. A fuel assembly of a boiling water reactor, comprising:
 a) a laterally outer fuel assembly case having an interior and open upper and lower ends;
 b) a cover plate covering said upper end of said case and having coolant outlets formed therein;
 c) a bottom plate covering said lower end of said case and having coolant inlets formed therein;
 d) a coolant tube extending in axial direction in the interior of said case and having upper and lower ends, each of said upper and lower ends having at least one opening formed therein for the passage of water, said coolant tube having a lower end piece joined to said bottom plate with a rigid connection transmitting substantially all forces exerted upon said bottom plate to said lower end piece and to said coolant tube, and said coolant tube having an upper end piece, and a releasable connection supporting said upper end piece at said cover plate;
 e) a plurality of spacers being substantially perpendicular to and retained on said coolant tube at predetermined axial positions, said spacers containing support ribs;
 f) a plurality of fuel rods being parallel to said case, being respectively supported on said support ribs and having lower ends, some of said fuel rods extending substantially as far as said cover plate; and
 g) lower closure caps standing unscrewed on said bottom plate and being disposed on said lower ends of at least all of said fuel rods extending substantially as far as said cover plate.

15. The fuel assembly according to claim 14, wherein at least two of said spacers are penetrated by all of said fuel rods, said fuel rods include first and second groups of fuel rods, each of said fuel rods at least in said first group extend from said bottom plate as far as said cover plate and carry one of said lower closure caps on said lower end, said bottom plate has an upper surface facing toward said cover plate, said lower closure caps stand on said upper surface of said bottom plate, said fuel rods of said first group have upper ends, and including upper closure caps on said upper ends being loosely disposed on said cover plate at given receiving positions.

16. The fuel assembly according to claim 15, wherein each of said fuel rods in said second group is shorter than a fuel rod in said first group and carries one of said lower closure caps on said lower end being retained on said bottom plate, said fuel rods of said second group have upper ends, and including upper closure caps on said upper ends being disposed in the vicinity of one of said spacers and being spaced apart from said cover plate.

17. The fuel assembly according to claim 16, including a plug connection joining said lower closure caps of said fuel rods of said second group to said bottom plate.

18. The fuel assembly according to claim 16, wherein said coolant outlets in said cover plate are outlet openings disposed between said given receiving positions of said fuel rods of said first group and enlarged outlet openings disposed in a projection of said shorter fuel rods.

19. The fuel assembly according to claim 16, wherein said fuel rods of said second group are each disposed along diagonals of the cross section of said case.

20. The fuel assembly according to claim 16, wherein said case has walls, some of said fuel rods are adjacent said walls, and each of said fuel rods adjacent said walls belongs to said first group.

21. The fuel assembly according to claim 20, wherein said support ribs of said spacers define first through eleventh rows and first through eleventh columns of meshes between said support ribs, counting from said wall inward, and said fuel rods of said second group are each disposed in one of said third row and said third column.

22. The fuel assembly according to claim 14, wherein said upper end piece of said coolant tube passes through said cover plate from below and is screwed to said cover plate from above.

23. The fuel assembly according to claim 14, including a handle, said upper end piece of said coolant tube being passed through said cover plate from below and screwed to said cover plate and to said handle from above.

24. The fuel assembly according to claim 14, including a handle, said upper end piece of said coolant tube being passed through said cover plate from below and screwed to said handle from above.

25. The fuel assembly according to claim 23, wherein said handle is undetachably secured to said cover plate.

26. The fuel assembly according to claim 24, wherein said handle is undetachably secured to said cover plate.

27. The fuel assembly according to claim 14, including a part formed onto said bottom plate into which said lower end piece of said coolant tube is introduced, and a securing bolt securing said lower end piece to said part, to protect against relative rotation of said bottom plate and said coolant tube.

28. The fuel assembly according to claim 14, wherein said cover plate is resiliently supported against said bottom plate.

29. The fuel assembly according to claim 14, wherein said coolant inlets in said bottom plate are flow openings having cross sections creating a uniform flow through the fuel assembly with a pressure loss being negligible as compared to a pressure loss at said coolant outlets in said cover plate.

30. The fuel assembly according to claim 1, wherein said fuel rods have upper and lower ends, and including threadless closure caps disposed on said upper and lower ends of all of said fuel rods.

31. The fuel assembly according to claim 3, wherein said fuel rods have upper and lower ends, and including threadless closure caps disposed on said upper and lower ends of all of said fuel rods.

32. The fuel assembly according to claim 14, wherein said lower closure caps are disposed on said lower ends of all of said fuel rods, said fuel rods have upper ends, and including upper closure caps disposed on all of said upper ends of said fuel rods, all of said closure caps disposed on said upper and lower ends of all of said fuel rods being threadless.

* * * * *